US005679222A

United States Patent [19]
Rasch et al.

[11] Patent Number: 5,679,222
[45] Date of Patent: Oct. 21, 1997

[54] PAPER HAVING IMPROVED PINHOLE CHARACTERISTICS AND PAPERMAKING BELT FOR MAKING THE SAME

[75] Inventors: David Mark Rasch; Larry Odell Seward; Glenn David Boutilier, all of Cincinnati, Ohio

[73] Assignee: The Procter & Gamble Company, Cincinnati, Ohio

[21] Appl. No.: 588,643

[22] Filed: Jan. 19, 1996

Related U.S. Application Data

[63] Continuation-in-part of Ser. No. 575,946, Dec. 20, 1995, Pat. No. 5,624,790, which is a continuation of Ser. No. 152,639, Dec. 20, 1993, Pat. No. 5,514,523, which is a continuation of Ser. No. 872,470, Apr. 20, 1992, Pat. No. 5,334,289, which is a division of Ser. No. 546,633, Jun. 29, 1990, abandoned.

[51] Int. Cl.[6] ............................................. D21F 1/10
[52] U.S. Cl. ...................... 162/358.1; 162/348; 162/900; 428/131
[58] Field of Search ........................... 162/109, 113, 162/115, 358.1, 358.2, 900, 901, 903, 315, 348; 428/131, 152, 247, 252, 255, 290

[56] References Cited

U.S. PATENT DOCUMENTS

| | | | |
|---|---|---|---|
| 3,301,746 | 1/1967 | Sanford et al. | 162/113 |
| 4,514,345 | 4/1985 | Johnson et al. | 264/22 |
| 4,528,239 | 7/1985 | Trokhan | 428/247 |
| 4,529,480 | 7/1985 | Trokhan | 162/109 |
| 4,637,859 | 1/1987 | Trokhan | 162/109 |
| 5,275,700 | 1/1994 | Trokhan | 162/358 |
| 5,334,289 | 8/1994 | Trokhan et al. | 162/358.2 |
| 5,431,786 | 7/1995 | Rasch et al. | 162/348 |
| 5,496,624 | 5/1996 | Stelljes, Jr. et al. | 428/229 |

Primary Examiner—Donald E. Czaja
Assistant Examiner—Steven B. Leavitt
Attorney, Agent, or Firm—Larry L. Huston; E. Kelly Linman; Jacobus C. Rasser

[57] ABSTRACT

A papermaking belt comprising a reinforcing structure and a framework. The reinforcing structure has air permeability not less than 800 cfm and a Fiber Support Index not less than 75. The framework is joined to the reinforcing structure and extends outwardly not more than about 6.5 mils from the reinforcing structure. The framework has deflection conduits dispersed throughout, encompassed by, and isolated one from another by the framework. A paper-contacting surface of the framework comprises a paper-side network which encompasses paper-side openings of the deflection conduits. A substantial portion of each paper-side opening is not less than about 45 mils in each of its dimensions measured in the X-Y plane. A paper web having two regions: an essentially continuous and macroscopically monoplanar network region, and a dome region comprising a plurality of discrete domes encompassed by the network region. The domes are distributed in a non-random, repeating pattern. A substantial portion of each dome is greater than about 45 mils in each of its dimensions measured in the X-Y plane. The density of the network region is greater than the density of the dome region.

17 Claims, 10 Drawing Sheets

PAPER HAVING IMPROVED PINHOLE CHARACTERISTICS AND PAPERMAKING BELT FOR MAKING THE SAME

This is a continuation-in-part of application Ser. No. 08/575,946 filed Dec. 20, 1995, now U.S. Pat. No. 5,624,790, which is continuation of the commonly assigned application Ser. No. 08/152,639 filed Dec. 20, 1993, now U.S. Pat. No. 5,514,523, which is continuation of the commonly assigned application Ser. No. 07/872,470 filed Apr. 20, 1992, now U.S. Pat. No. 5,334,289, which is divisional of the commonly assigned application Ser. No. 07/546,633 filed Jun. 29, 1990, now abandoned.

FIELD OF THE INVENTION

The present invention is related to papermaking belts useful in papermaking machines for making strong, soft, absorbent paper products and the paper products produces thereby. More particularly, this invention is concerned with papermaking belts comprised of a resinous framework and a reinforcing structure and the multi-density paper products produced thereby.

BACKGROUND OF THE INVENTION

Paper products are used for a variety of purposes. Paper towels, facial tissues, toilet tissues, and the like are in constant use in modern industrialized societies. The large demand for such paper products has created a demand for improved versions of the products. If the paper products such as paper towels, facial tissues, toilet tissues, and the like are to perform their intended tasks and to find wide acceptance, they must possess certain physical characteristics. Among the more important of these characteristics are strength, softness, and absorbency.

Strength is the ability of a paper web to retain its physical integrity during use.

Softness is the pleasing tactile sensation consumers perceive when they use the paper for its intended purposes.

Absorbency is the characteristic of the paper that allows the paper to take up and retain fluids, particularly water and aqueous solutions and suspensions. Important not only is the absolute quantity of fluid a given amount of paper will hold, but also the rate at which the paper will absorb the fluid.

Through air dried paper webs are made as described in U.S. Pat. No. 4,514,345 issued to Johnson et al on Apr. 30, 1985; U.S. Pat. No. 4,528,239 issued to Trokhan on Jul. 9, 1985; and U.S. Pat. No. 5,334,289 issued to Trokhan et al on Aug. 2, 1994—all three patents are assigned to The Procter and Gamble Company and incorporated herein by reference.

Paper produced by through air drying is disclosed in U.S. Pat. No. 4,529,480 and U.S. Pat. No. 4,637,859, both issued in the name of Trokhan, which patents are incorporated herein by reference. The paper of these patents is characterized by having two physically distinct regions: a continuous network region having a relatively high density and a region comprised of a plurality of domes dispersed throughout the whole of the network region. The domes are of relatively low density and relatively low intrinsic strength compared to the network region.

Generally, the papermaking process includes several steps. An aqueous dispersion of the papermaking fibers is formed into an embryonic web on a foraminous member, such as a Fourdrinier wire. This embryonic web is associated with a deflection member having a macroscopically monoplanar, continuous, patterned non-random network surface which defines within the deflection member a plurality of discrete, isolated deflection conduits. The papermaking fibers in the embryonic web are deflected into the deflection conduits and water is removed through the deflection conduits to form an intermediate web. The intermediate web is dried and foreshortened by creping. The creping is a process of the removal of the dried intermediate web from the surface (usually, also drying surface, such as the surface of a Yankee dryer) with a doctor blade to form a finished paper web.

Deflection of the fibers into the deflection conduits can be induced by, for example, the application of differential fluid pressure to the embryonic paper web. One preferred method of applying differential pressure is by exposing the embryonic web to a vacuum through the deflection conduits. As a result of a sudden application of the vacuum pressure, a deflection of the fibers into the deflection conduits occurs, which can lead to separation of the deflected fibers from each other and from the embryonic web. In addition, as a result of a sudden application of a vacuum pressure, a certain number of partially dewatered fibers separated from the embryonic web could completely pass through the papermaking belt. These phenomena causes formation of pin-sized holes, or pinholes, in the domes of the finished paper web, and clogging the vacuum dewatering machinery.

The undesirable creation of pinholes in the domes of the paper web, or pinholing, was mitigated by commonly assigned U.S. Pat. No. 5,334,289, issued on Aug. 2, 1994 to Trokhan et al. and incorporated by reference herein. This patent provided surface texture irregularities in the backside network. The backside irregularities mitigate the effect of a sudden application of a vacuum pressure. Still, search for improved products has continued.

It is an object of the present invention to provide an improved papermaking belt which substantially reduces the pinholing in the finished paper web and the buildup of paper fibers on the vacuum dewatering machinery.

It is another object of the present invention to develop a paper in which the number of pinholes in the dome region of the finished paper web is substantially reduced.

SUMMARY OF THE INVENTION

A papermaking belt of the present invention is generally comprised of two primary elements: a reinforcing structure and a framework. In its preferred form, the papermaking belt is an endless belt which has a paper-contacting side and a backside opposite the paper-contacting side.

The reinforcing structure has a paper-facing side and a machine-facing side opposite the paper-facing side. The reinforcing structure has air permeability not less than 800 cfm and a Fiber Support Index not less than 75. In its preferred form, the reinforcing structure is a woven element. Preferably, the reinforcing structure comprises two parallel layers of interwoven yarns interconnected in a contacting face-to-face relationship by tie yarns. Alternatively, the reinforcing structure can comprise a non-woven element, such as felt.

The framework is joined to the reinforcing structure and extends outwardly not more than about 6.5 mils from the paper-facing side of the reinforcing structure, one mil being equal to one-thousandths of an inch. A variety of suitable resins can be used as the framework.

The framework has a first surface defining the paper-contacting side of the papermaking belt, a second surface opposite the first surface, and deflection conduits extending between the first surface and the second surface. The first surface comprises a paper-side network and paper-side openings where the deflection conduits intercept the first surface. Essentially all paper-side openings are dispersed throughout, encompassed by, and isolated one from another by the paper-side network. The second surface comprises a backside network encompassing backside openings. The paper-side openings and the backside openings define the deflection conduits. A substantial portion of each paper-side opening is not less than about 45 mils in each of its dimensions measured in the X-Y plane. In a preferred embodiment, the perimeter of each paper-side opening defines a closed figure, such as a bow-tie shaped figure, a diamond-shaped figure and the like, and the openings are disposed in the first surface in a non-random, repeating pattern.

A paper of the present invention has two regions: a network region and a dome region. The network region is an essentially continuous, essentially macroscopically monoplanar region. The dome region comprises a plurality of discrete domes encompassed by the network region. A substantial portion of each dome is not less than about 45 mils in each of its dimensions measured in the X-Y plane. In the preferred embodiment, the perimeter of each of the majority of the domes defines a closed figure, such as bow-tie shaped figure, a diamond-shaped figure and the like, and the domes are distributed in a non-random, repeating pattern.

BRIEF DESCRIPTION OF THE DRAWING

FIGS. 11 and 11a are schematic only, illustrating the method of establishing whether a substantial part of the opening of the deflection conduit is not less than about 45 mils in each of its X-Y dimensions. FIGS. 11 and 11a should not be used to scale the areas of the openings 42 which meet the 45 mil criterion.

FIGS. 12a and 12b are representations of two digitized images of pinholes of the paper web samples, as seen on a computer screen.

DETAILED DESCRIPTION OF THE INVENTION

The specification contains a detailed description of (1) the papermaking belt of the present invention and (2) the finished paper product of the present invention.

(1) The Papermaking Belt

Figure 1:
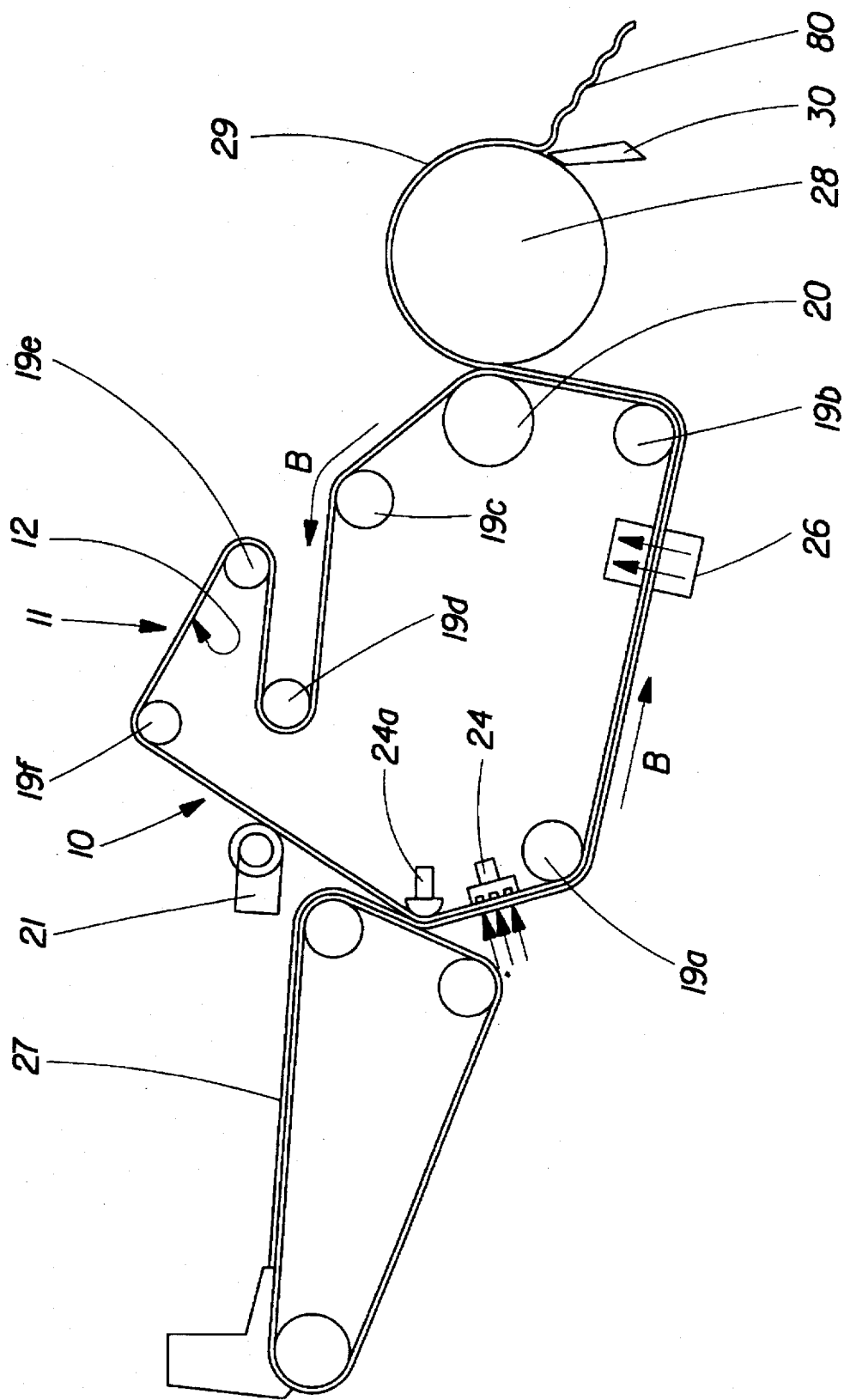
FIG. 1 is a schematic side elevational view of one embodiment of a continuous papermaking process which uses the papermaking belt of the present invention.

In the representative papermaking machine schematically illustrated in FIG. 1, the papermaking belt of the present invention takes the form of an endless belt, papermaking belt 10. The papermaking belt 10 has a paper-contacting side 11 and a backside 12 opposite the paper-contacting side 11. The papermaking belt 10 carries a paper web (or "fiber web") in various stages of its formation (an embryonic web 27 and an intermediate web 29). Processes of forming embryonic webs are described in many references, such as U.S. Pat. No. 3,301,746, issued to Sanford and Sisson on Jan. 31, 1974, and U.S. Pat. No. 3,994,771, issued to Morgan and Rich on Nov. 30, 1976, both incorporated herein by reference. The papermaking belt 10 travels in the direction indicated by directional arrow B around the return rolls 19a and 19b, impression nip roll 20, return rolls 19c, 19d, 19e, 19f, and emulsion distributing roll 21. The loop around which the papermaking belt 10 travels includes a means for applying a fluid pressure differential to the embryonic web 27, such as vacuum pickup shoe 24a and multislot vacuum box 24. In FIG. 1, the papermaking belt 10 also travels around a predryer such as blow-through dryer 26, and passes between a nip formed by the impression nip roll 20 and a Yankee dryer drum 28.

Although the preferred embodiment of the papermaking belt of the present invention is in the form of an endless belt 10, it can be incorporated into numerous other forms which include, for instance, stationary plates for use in making handsheets or rotating drums for use with other types of continuous process. Regardless of the physical form which the papermaking belt 10 takes, it generally has certain physical characteristics set fourth below. The papermaking belt 10 of the present invention may be made according to commonly assigned U.S. Pat. No. 5,334,289, issued in the name of Trokhan et al., which patent is incorporated by reference herein.

Figure 2:
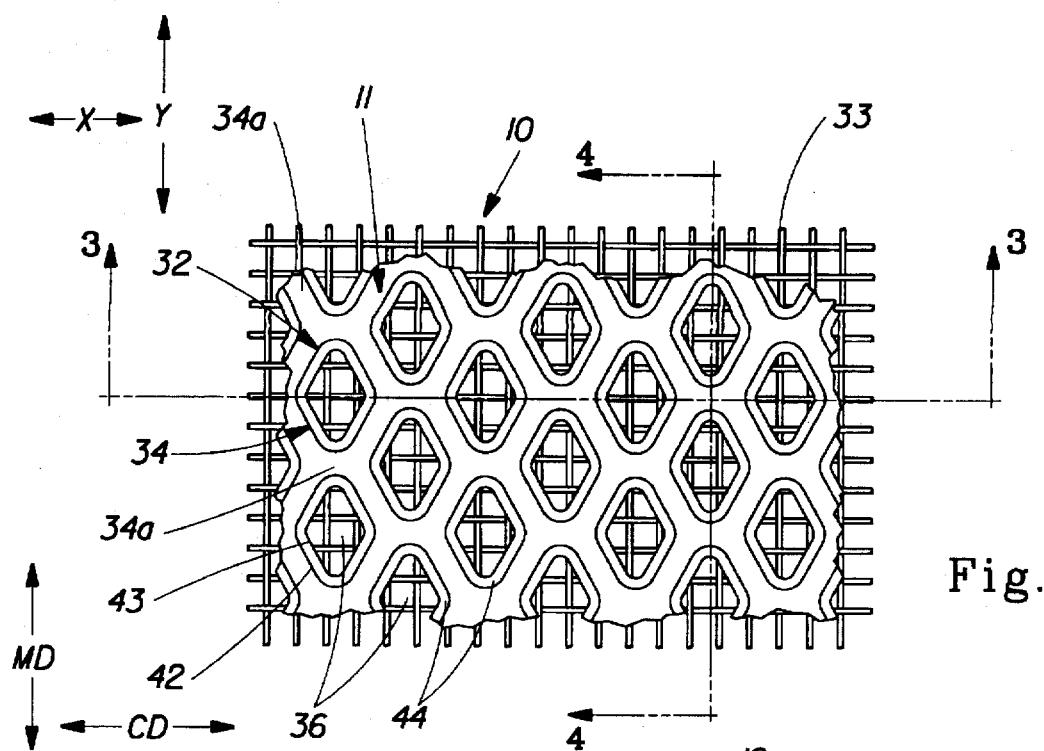
FIG. 2 is a top plan view of a portion of the papermaking belt of the present invention, showing the framework joined to the reinforcing structure and having diamond-shaped paper-side openings of the deflection conduits.
Figure 3:
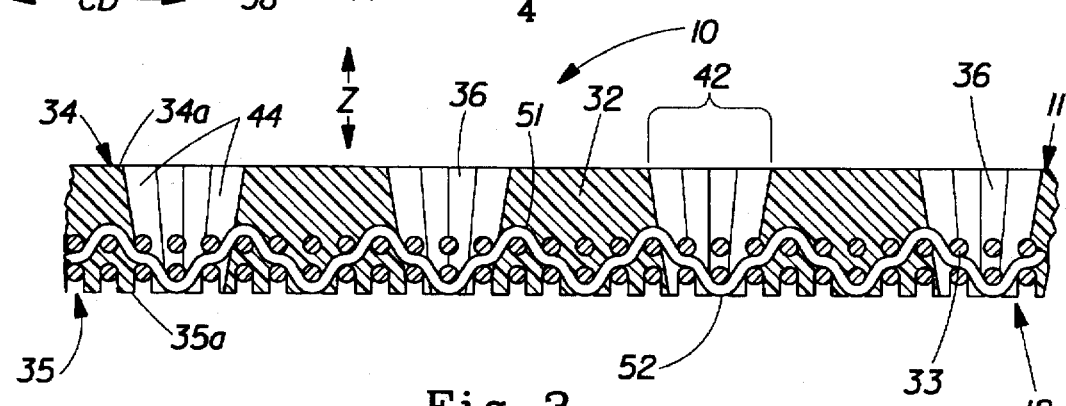
FIG. 3 is a vertical cross-sectional view of a portion of the papermaking belt shown in FIG. 2 as taken along line 3—3.
Figure 4:
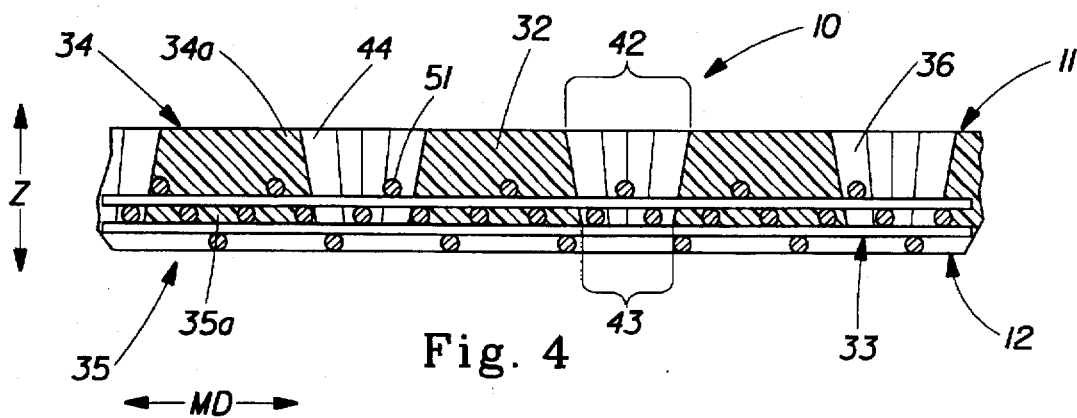
FIG. 4 is a vertical cross-sectional view of a portion of the papermaking belt shown in FIG. 2 as taken along line 4—4.

As shown in FIGS. 2–4, the papermaking belt 10 of the present invention is generally comprised of two primary elements: a framework 32, and a reinforcing structure 33. The framework 32 has a first surface 34, a second surface 35 opposite the first surface 34, and deflection conduits 36 extending between the first surface 34 and the second surface 35. The first surface 34 of the framework 32 contacts the embryonic web fibers to be dewatered, and defines the paper-contacting side 11 of the papermaking belt 10. The deflection conduits 36 extending between the first surface 34 and the second surface 35 channel water from the embryonic web 27 which rest on the first surface 34 to the second surface 35 and provide areas into which the fibers of the embryonic web 27 can be deflected and rearranged. As used herein, the term "dome" indicates the area of the paper web formed by the fibers deflected into the individual deflection conduit 36. The first surface 34 of the framework 32 comprises a paper-side network 34a and paper-side openings 42 formed therein. That is to say, the paper-side network 34a comprises a surface of the solid portion of the framework 32, or a portion of the first surface 34, which surrounds and defines the paper-side openings 42 in the first surface 34.

The second surface 35 of the framework 32 comprises a backside network 35a and backside openings 43. The backside network 35a surrounds and defines the backside openings 43 in the second surface 35. The paper-side openings 42 and the backside openings 43 define the deflection conduits 36. The paper-side opening 42 preferably are uniform shape and are distributed in a non-random, repeating pattern. The pattern comprising a bilaterally staggered array is preferred. The backside openings 43 are also preferably uniform shape and are distributed in a non-random, repeating pattern. Accordingly, the deflection conduits 36 are preferably arranged in a non-random, repeating pattern comprising bilaterally staggered array. In FIG. 2, the openings 42 are shown as having a diamond-shaped configuration, but it will be apparent to one skilled in the art that the paper-side network 34a and the backside network 35a can be provided with a variety of patterns having various shapes, sizes, and orientations. The practical shapes of the paper-side openings 42 and the backside openings 43 include, but are not limited to, circles, ovals, polygons of six and fewer sides, bow-tie shaped figures, weave-like patterns.

The profile of the cross-section of the walls 44 of the deflection conduits 36 can be relatively straight, curved, partially straight and partially curved, or irregular when viewed in cross section. It should be noted that the drawings schematically show the walls 44 of the conduits 36 as straight lines for ease of illustration only. The profile of the cross-section of the walls 44 of the deflection conduits 36 is disclosed in greater detail in U.S. Pat. No. 5,334,289.

A variety of suitable resins can be used as the framework 32. U.S. Pat. No. 4,529,480 describing the suitable resins for the framework 32 is incorporated herein by reference.

As shown in FIGS. 2–5, and 9, the framework 32 is joined to the reinforcing structure 33. The reinforcing structure 33 has a paper-facing side 51 and a machine-facing side 52, opposite the paper-facing side 51. The framework 32 extends outwardly from the paper-facing side 51 of the reinforcing structure 33. The reinforcing structure 33 strengthens the resin framework 32 and has suitable projected open area to allow the vacuum dewatering machinery employed in the papermaking process to perform adequately its function of removing water from the embryonic web 27, and to permit water removed from the embryonic web 27 to pass through the papermaking belt 10.

Figure 5:
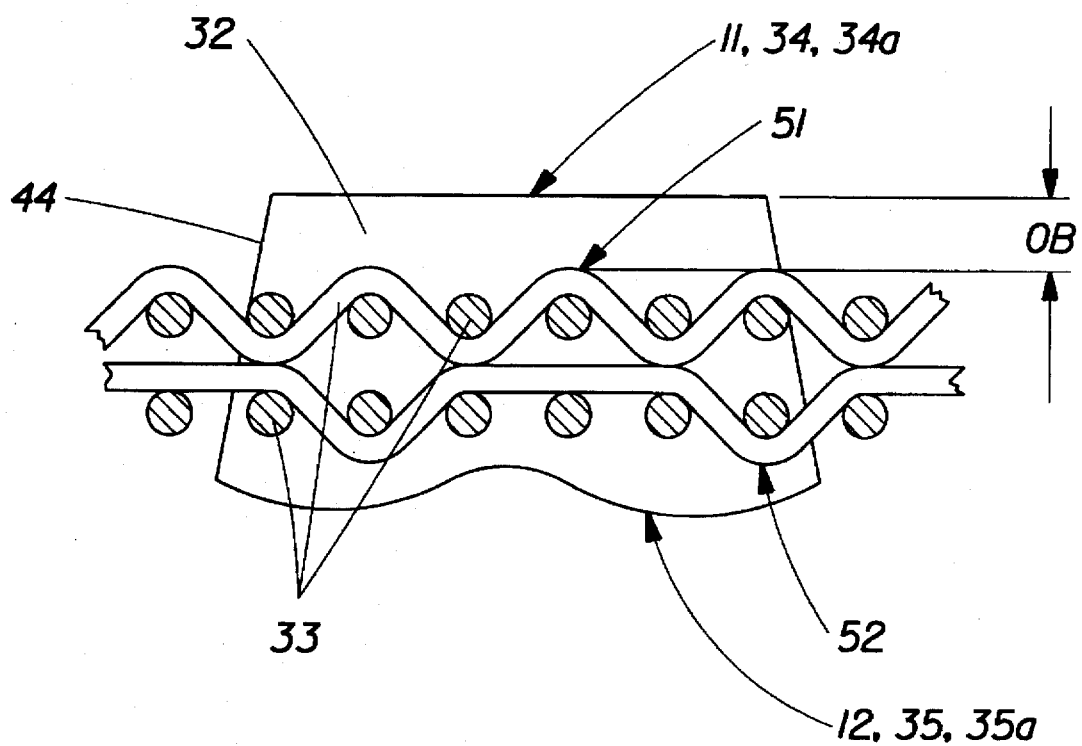
FIG. 5 is a simplified representation in vertical cross-section of a portion of the papermaking belt of FIGS. 2–4 showing the overburden.

As used herein, the term "overburden" means the portion of the resin framework 32 extending from the paper-facing side 51 of the reinforcing structure 33. In FIG. 5 the overburden is designated as OB. More particularly, the overburden is defined by the distance between the first surface 34 (and, for this purpose, the paper-side network 34a) of the framework 32 and the paper-facing side 51 of the reinforcing structure 33.

It has been believed that the increase of thickness and absorbency of the paper can be achieved by increasing a caliper of the embryonic web 27. One way of increasing the caliper is to increase the overburden OB. In theory, the greater the overburden OB, the more fibers can be deflected and accumulated in the deflection conduits 36. The greater overburden enables the conduits 36 to serve adequately their purpose of providing a space into which the fibers of the embryonic web 27 can be deflected so that these fibers can be rearranged without the constraint of the strands of the reinforcing structure 33. The preferred range of the overburden used in the prior art is disclosed in U.S. Pat. No. 5,334,289 as being between about 4 mils and about 30 mils (0.102 mm and 0.762 mm).

However, there are at least two practical problems associated with a relatively high overburden. First, excessive deflection and accumulation of fibers into the deflection conduits can decrease the air permeability of the belt. As a result, the deflected fibers can be ripped apart from each other by an application of a vacuum pressure destroying existing bonds between the fibers, thus creating pinholes in the paper substrate. Moreover, some of the deflected fibers can be "blown away" through the papermaking belt 10 by an application of a vacuum pressure, even further exaggerating the effect of pinholing. Second, pinholing causes the hot drying air to predominantly go through the formed pinholes, since the pinholes are the natural paths of less resistance for the drying air. Thus, pinholing interferes with the effective drying of the intermediate web 29, decreasing the drying speed and/or increasing the cost of drying. Consequently, the speed of the whole papermaking process needs to be decreased or the cost of pre-drying needs to be increased.

While not intending to be limited by theory, it is believed that much of the caliper generation can be achieved at the creping operation. As shown in FIG. 1, in the drying operation, the web 29 is adhered to a Yankee surface 28 and then removed from the Yankee surface 28 with a doctor blade 30. It has been found that the effective caliper generation occurs at the preferred Yankee speed of not less than about 1000 feet per minute (fpm). More preferably, the Yankee speed is not less than about 3500 fpm.

The findings that the desired caliper generation can be achieved at this creping speed tends to unexpectantly eliminate need to increase the overburden OB. In the present invention, the preferred range of the overburden is between about 1 mil and about 6.5 mils (0.0254 mm and 0.1651 mm), which is considerably less than would be expected from the prior art findings. The more preferred range of the overburden is between about 2.5 and about 5.5 mils. The most preferable overburden range is between about 4 and about 5 mils.

It has also been found the low overburden can be particularly advantageous if used in combination with large domes and high fiber support. As used herein, the term "large dome" refers to a dome, a substantial portion of which is not less than about 45 mils in each of its dimensions measured in the X-Y plane at the level of paper-side network 34a. As used herein, X, Y and Z directions are orientations relating to the papermaking belt 10 of the present invention (or paper web disposed on the belt) in a Cartesian coordinate system. In the Cartesian coordinate system described herein, the paper-contacting side 11 and the backside 12 of the papermaking belt 10 lie in the plane formed by the X and Y axes. The X axis is the cross-machine direction, the Y axis is the machine direction, and the Z axis is perpendicular to the plane defined by the X and Y axes. As used herein, the term "substantial portion" means not less than about 40% of the X-Y area of the individual dome and—accordingly—not less than about 40% of the area of the individual paper-side opening 42 of the deflection conduit 36, measured in the X-Y plane at the level of the network region 83 and the paper-side network 34a.

Figure 8:
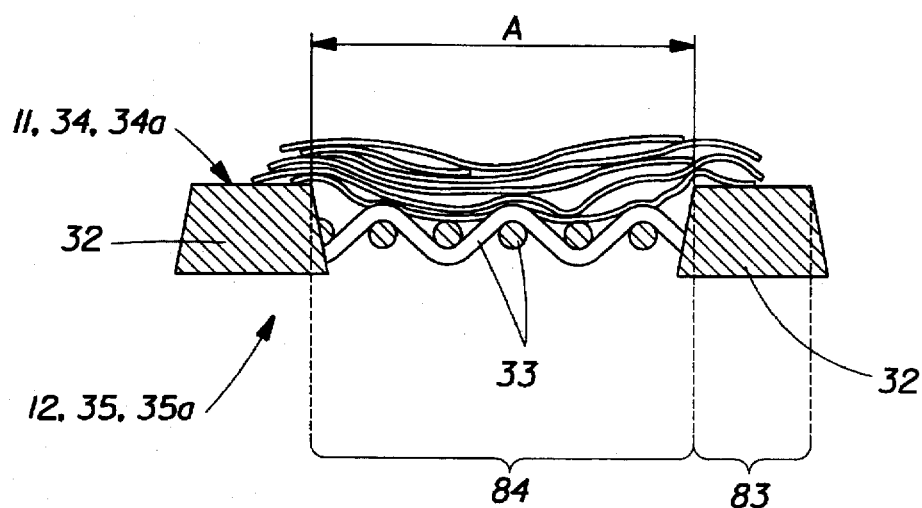
FIG. 8 is a simplified schematic representation of a cross-section showing full deflection of the fibers into the conduits of the papermaking belt.
Figure 10:
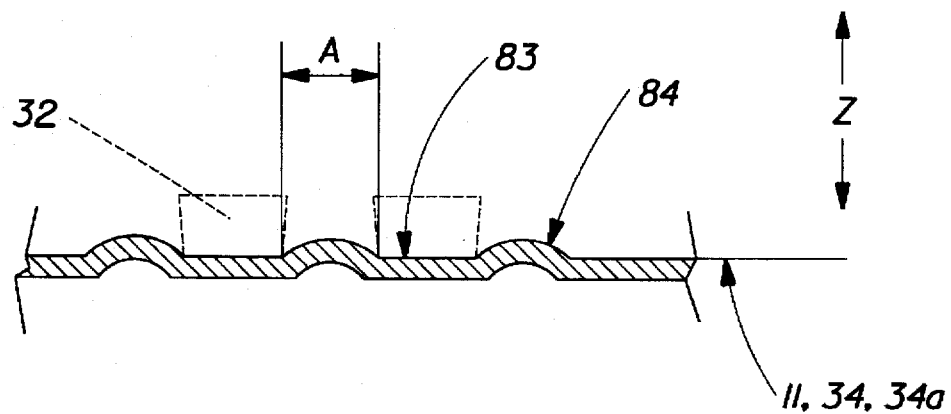
FIG. 10 is a vertical sectional view of a portion of the paper web shown in FIG. 9a as taken along line 10—10.

Because the X-Y geometry of the domes reflects the geometry of the paper-side openings 42 of the conduits 36, it will be apparent to one skilled in the art that in order to produce a paper with large domes, the substantial portion of the paper-side opening 42 of the conduit 36 should also be not less than about 45 mils in each of its dimensions measured in the X-Y plane at the level of the paper-side network 34a. In FIGS. 8 and 10, the symbol "A" indicates one of the dimensions of the opening 42 as measured in the X-Y plane at the level of the paper-side network 34a.

Figure 11:
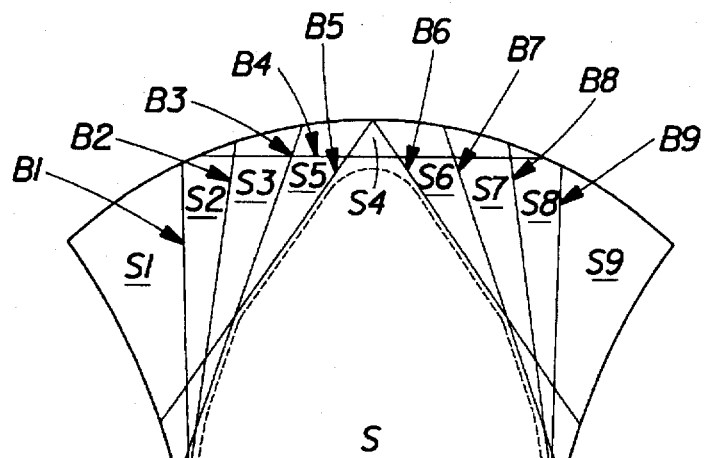
FIG. 11 is an enlarged schematic representation of one exemplary paper-side opening, having a bow-tie shaped configuration, of the deflection conduit of the papermaking belt of the present invention.
Figure 11:
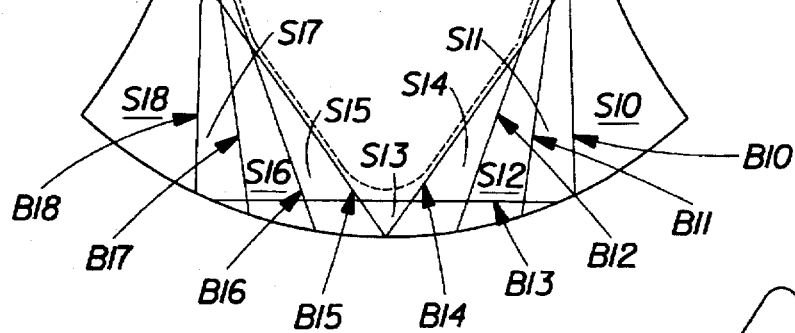
Figure 11A:
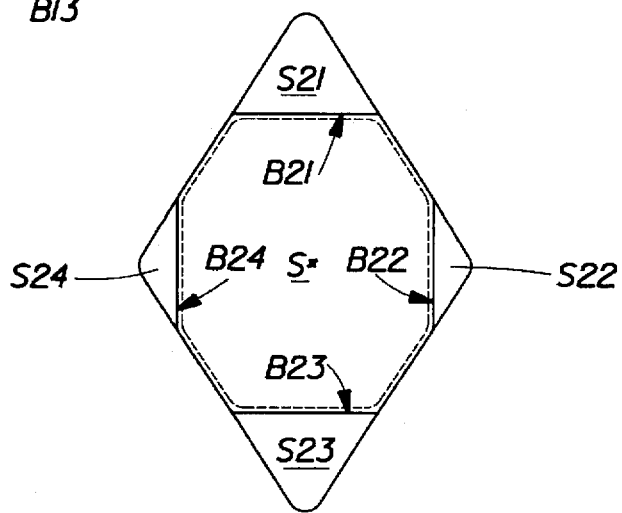
FIG. 11a is an enlarged schematic representation of one exemplary paper-side opening, having a diamond-shaped configuration, of the deflection conduit of the papermaking belt of the present invention.

FIGS. 11 and 11a illustrate what is meant by a requirement that a substantial portion of the paper-side opening 42 is not less than about 45 mils in each of its dimensions measured in the X-Y plane at the level of paper-side network 34a. In FIG. 11, an exemplary paper-side opening 42 in the form of a bow-tie shaped figure is shown. The symbols "S1" through "S18" represent individual areas of the paper-side opening 42. The individual areas S1 through S18 are formed by corresponding border lines B1 through B18 and the perimeter of the opening 42. The length of each border line B1, B2, . . . B18 is equal to 45 mils. As FIG. 11 shows, at least some of the dimensions of the individual areas S1 through S18 are less than 45 mils. The number of the border lines and the location of each border line are found such as to maximize the resulting areas formed by the multiplicity of the border lines and the perimeter of the opening 42. The symbol "S" represents the portion of the opening 42 formed by subtracting from the whole area of the opening 42 the resulting areas formed by the border lines and the perimeter of the paper-side opening 42. In FIG. 11, the perimeter of the area S is designated by a dotted line. According to the present invention, S should comprise a substantial portion of the opening 42. Preferrably, the number of the bow-tie shaped conduits is not greater than about 80 conduits per squire inch.

In FIG. 11a, an exemplary paper-side opening 42 in the form of a dimond-shaped figure is shown. Analogously to the example shown in FIG. 11, the symbols "S21," "S22," "S23," "S24" represent individual areas, or portions of the paper-side opening 42, formed by the border lines B21, B22, B23, B24, each of them being equal to 45 mils, and the perimeter of the opening 42. The symbol "S*" represents the portion of the opening 42 formed by subtracting the resulting areas of the opening 42 formed by the border lines B21–B24 and the line defining the perimeter of the paper-side opening 42 from the whole area of the opening 42. According to the present invention, S* should comprise a substantial portion of the opening 42.

It should be pointed out that the resulting area or the sum of the resulting areas formed by the border lines and the perimeter of the opening 42 may be equal or smaller than the arithmetic sum of the individual areas formed by the border lines and the perimeter of the opening 42. FIG. 11 illustrates the situation when the sum of the resulting areas formed by the border lines B1 through B18 and the perimeter are smaller than the sum of the individual areas S1 through S18. FIG. 11a illustrates the situation when the resulting areas formed by the border lines B21 through B24 and the perimeter of the opening 42 are equal to the sum of the individual areas S21–S24.

It should be noted that the examples shown in FIGS. 11 and 11a are presented for the purposes of illustration only, and not for the purposes of limitation. The paper-side openings 42 can comprise a variety of shapes including, but not limited to, ovals, polygons, weave-like patterns and the like, and the same method of establishing whether the substantial part of the opening 42 is not less than 45 mils in any of its dimensions measured in X-Y plane would apply. FIGS. 11 and 11a are schematic only, illustrating the method of establishing whether the substantial part of the opening 42 is not less than about 45 mils in each of its dimensions measured in the X-Y plane. FIGS. 11 and 11a should not be used to scale the real dimensions of the openings 42, the lengths and locations of the border lines, and the areas formed by the border lines and the perimeter(s) of the openings 42.

The domes are formed when the deflection of the fibers into the deflection conduits 36 occurs. When the fibers are deflected into the deflection conduits 36, water removal from the embryonic web 27 and through the deflection conduits 36 begins. This water removal results in a decrease in fiber mobility in the embryonic web 27. This decrease in fiber mobility tends to fix the fibers in place after they have been deflected and rearranged. Deflection of the fibers into the deflection conduits 36 can be induced by, for example, the application of differential fluid pressure to the embryonic web 27. One preferred method of applying differential pressure is by exposing the embryonic web 27 to a vacuum through deflection conduits 36. In FIG. 1 the preferred method is illustrated by the use of vacuum box 24. Optionally, positive pressure in the form of air pressure can be used.

Figure 6:
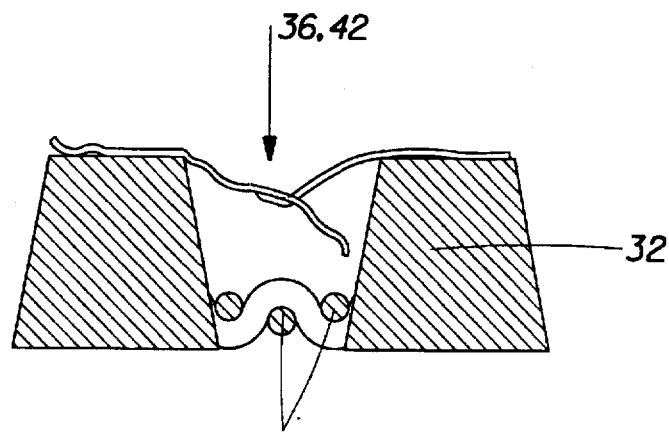
FIG. 6 is a simplified schematic representation of a vertical cross-section showing fibers bridging the conduits of the papermaking belt.
Figure 7:
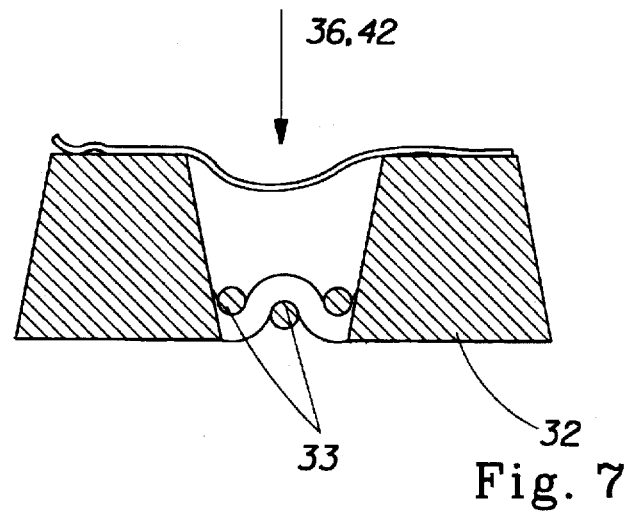
FIG. 7 is a simplified schematic representation of a cross-section similar to FIG. 6.

Without being limited by theory, it is believed that the rearrangement of the fibers in the embryonic web 27 can generally take one of two models dependent on a number of factors including fiber length. The free ends of longer fibers can be merely bent into the conduits 36 while their opposite ends are restrained in the region of network surfaces. As schematically shown in FIG. 6, these free ends of the longer fibers can bond together in the area of the deflection conduit 36 without reaching the reinforcing structure 33. Or, as schematically shown in FIG. 7, the middle parts of longer fibers can be bent into the conduit 36 without being fully deflected. Thus, "bridging" of the deflection conduit 36 occurs. Alternatively, fibers (predominantly, the shorter ones) can actually be fully deflected into the conduit 36 and contact the reinforcing structure 33, as shown in FIG. 8.

As noted above, in the present invention, the substantial portion of the paper-side opening 42 of the deflection conduit 36 is not less than about 45 mils in each of its dimensions measured in the X-Y plane. This size allows substantially all fibers that have been deflected to be fully deflected into the deflection conduits 36, as schematically shown in FIG. 8. While applicants decline to be bound by any particular theory, it appears that, providing the low overburden and high fiber support are present, full deflection of the fibers into the conduits 36 provides more caliper, improves thickness impression and enhances strength of the finished paper product, compared to paper having domes formed by other methods than full deflection of the fibers into the conduits 36.

The reinforcing structure 33 is one of the primary elements of the papermaking belt of the present invention. The reinforcing structure 33 strengthens the resin framework 32 and has a suitable projected open area in order to allow the vacuum dewatering machinery employed in the papermaking process to adequately perform its function of removing water from partially-formed webs of paper, and to permit water removed from the paper web to pass through the papermaking belt 10. Therefore, the reinforcing structure 33 should be highly permeable to fluids such as air and water. By "highly permeable" it is meant that the reinforcing structure 33 should have an air permeability not less than about 800 cubic feet per minute (cfm) per square foot of its surface at a pressure differential of 100 Pascals. The reinforcing structure 33 of the present invention has the preferred air permeability between about 900 and about 1100 cfm per square foot of its surface at a pressure differential of 100 Pascals. More preferably, the air permeability of the reinforcing structure 33 of the present invention is between about 950 and about 1050 cfm per square foot at a pressure differential of 100 Pascals. The most preferable air permeability of the reinforcing structure 33 of the present invention is about 1000 cfm per square foot at a pressure differential of 100 Pascals.

At the same time, the reinforcing structure 33 of the present invention has also an important function of supporting the fibers fully deflected into the conduits 36, not allowing them to be blown through the belt 10. Therefore, the high fiber support provided by the reinforcing structure 33 of the present invention is of primary importance. By "high fiber support" it is meant that the reinforcing structure 33 of the present invention has a Fiber Support Index of not less than about 75. As used herein, the Fiber Support Index or FSI is defined in Robert L. Beran, "The Evaluation and Selection of Forming Fabrics," *Tappi* April 1979, Vol. 62, No. 4, which is incorporated by reference and attached as an Appendix 1 herein. Preferably, the reinforcing structure of the present invention has FSI not less than 85. More preferably, the FSI is greater than 90.

Figure 5A:
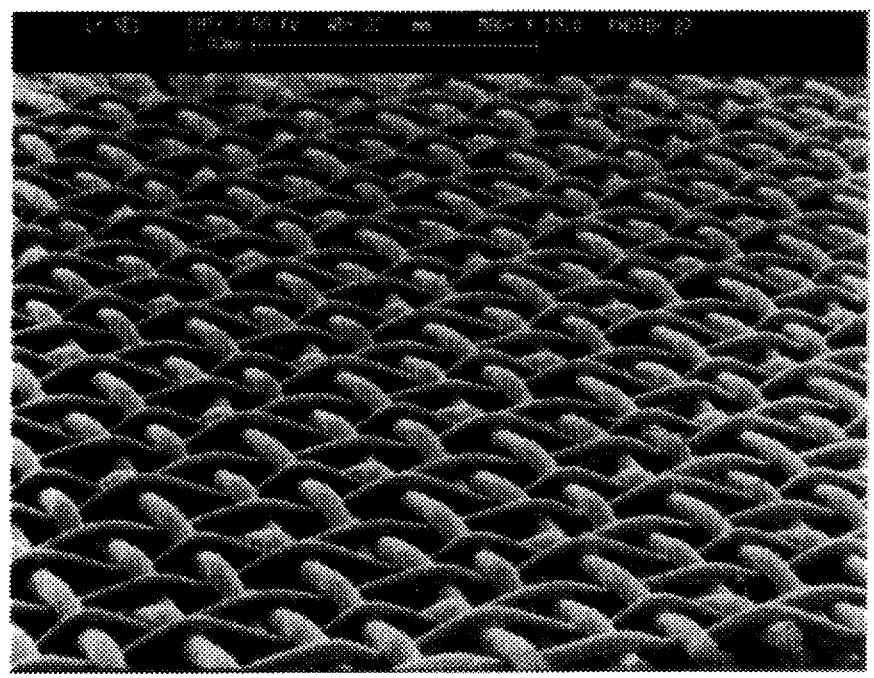
FIG. 5a is an enlarged photograph of one embodiment of the reinforcing structure of the papermaking belt of the present invention, showing the top of the first layer of the interwoven yarns interconnected in a contacting face-to-face relationship with a second layer (not shown) of interwoven yarns by tie yarns.

The reinforcing structure 33 can take any number of different forms. It can comprise a woven element, a nonwoven element, a screen, a net, a scrim, or a band or plate having plurality of holes. Preferably, the reinforcing structure 33 comprises a woven element, and more particularly, a foraminous woven element, such as disclosed in U.S. Pat. No. 5,334,289 which patent is incorporated by reference herein. More preferably, the reinforcing structure comprises a first layer of interwoven yarns and a second layer of interwoven yarns being substantially parallel to each other and interconnected in a contacting face-to-face relationship by a tie yarns. The first layer and the second layer can individually comprise a plurality of machine-direction yarns interwoven with a plurality of cross-machine direction yarns. This type of the reinforcing structure 33 is illustrated in FIG. 5a. U.S. patent application Ser. No. 08/254,387, filed Jun. 2, 1994 in the names of Stelljes, Jr. et al. and allowed on Sep. 12, 1995 under Issue Batch No. P13 is incorporated herein by reference to show a suitable reinforcing structure 33. According to U.S. patent application Ser. No. 08/254,387, the web facing first layer is woven so that the top dead center longitude of each yarn of the first layer that is in the top plane of the paper-facing side 51 does not extend more than 1.5 yarn diameters, and preferably not more than 1.0 yarn diameters away from the top plane of the paper-facing side 51, and remains within 1.0 or 1.5 yarn diameters of the paper-facing side 51 at all positions, unless such yarn is a tie yarn interconnecting the first and the second layers.

While a woven element is a preferable for the reinforcing structure 33 of the present invention, a papermaking belt 10 according to the present invention can be made using a felt as a reinforcing structure, as set forth in the patent applications: Ser. No. 08/391,372, filed Feb. 15, 1995 in the name of Trokhan et al. and entitled: "Method Of Applying A Curable Resin To A Substrate For Use In Papermaking;" Ser. No. 08/268,213, filed Jun. 29, 1994 in the name of Trokhan et al. and allowed on Aug. 22, 1995, entitled: "Paper Structures Having At Least Three Regions Disposed At Different Elevations, and Apparatus And Process For Making The Same;" Ser. No. 08/461,832, filed Jun. 5, 1995 in the name of Trokhan et al. and entitled: "Web Patterning Apparatus Comprising A Felt Layer And A Photosensitive Resin Layer." All of these patent applications are assigned to The Procter & Gamble Company and are incorporated herein by reference.

The Paper

Papermaking fibers useful in the present invention include those cellulosic fibers commonly known as wood pulp fibers. Fibers derived from soft woods (gymnosperms or coniferous trees) and hard woods (angiosperms or deciduous trees) are contemplated for use in this invention. Preferably, the weight ratio: soft wood fibers/hard wood fibers is about 25/75. The particular species of trees from which the fibers are derived are immaterial. In addition to the various wood pulp fibers, other cellulosic fibers, such as cotton linters, rayon, and bagasse, can be used in this invention. Synthetic fibers, such as polyester and polyolefin fibers can also be used.

Figure 9:
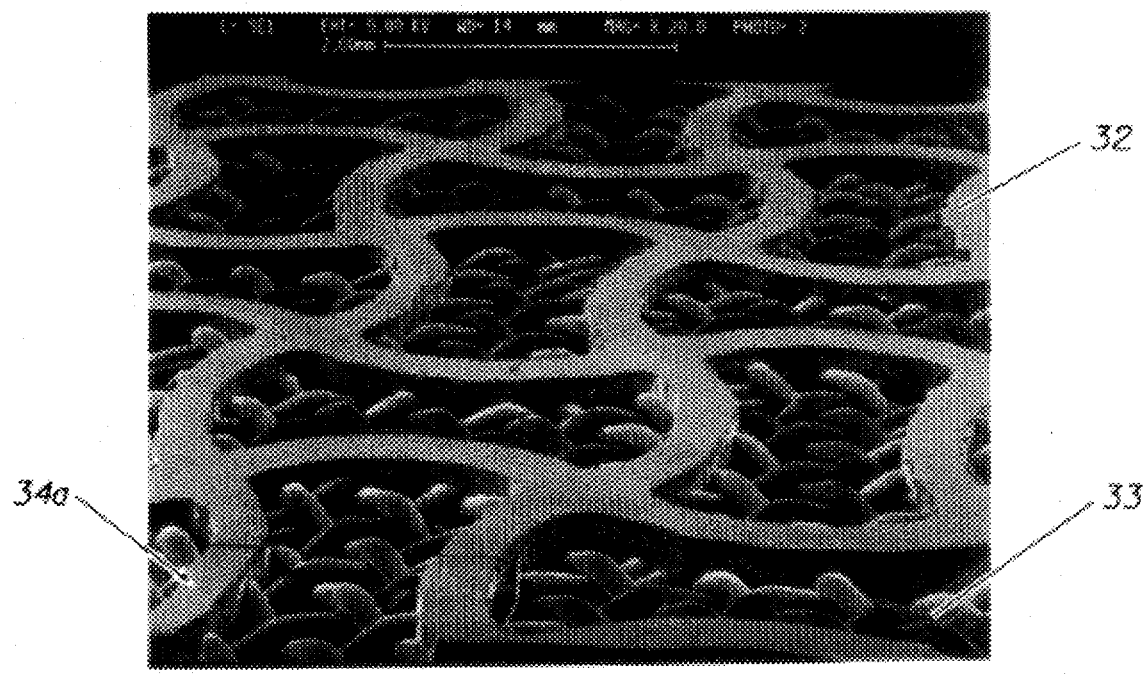
FIG. 9 is an enlarged photograph of one embodiment of the framework joined to the reinforcing structure of the papermaking belt of the present invention, showing the bow-tie openings of the deflection conduits.

As shown in FIGS. 9 and 10, the improved finished paper web 80 of the present invention is characterized as having two distinct regions: a network region 83 and a dome region 84. The network region 83 corresponds to and is formed on the paper-side network 34a of the first surface 34 of the papermaking belt 10. The network region 83 is an essentially continuous, macroscopically monoplanar region having a non-random, repeating pattern. It is described as "continuous" because it comprises the system of essentially uninterrupted lines forming at least one essentially unbroken net-like pattern of essentially uniform physical characteristics. The pattern is said to be "essentially" continuous because it is recognized that the interruptions in the pattern may be tolerable, but not preferred. The network region 83 is described as "macroscopically monoplanar" because the top surface of the network region (i.e., the surface lying on the same side of the paper web as the protrusions of the domes) is essentially planar when the paper web 80 as a whole is placed in a planar configuration. It is "essentially" monoplanar because minor deviations from absolute planarity are tolerable, but not preferred.

The dome region 84 comprises a plurality of domes dispersed throughout the whole of the network region 83. Essentially each individual dome is encompassed by, and isolated one from another, by the network region 83. The domes are distributed in a non-random repeating pattern. Preferably this repeating pattern comprises a bilaterally staggered array. A substantial portion of each dome is greater than about 45 mils in each of its dimension measured in the X-Y plane at the level of the network region 83. In the plane of the paper web 80 (or in X-Y plane), the shape of the domes is defined by the network region 83. That is to say, the shape of the domes in the X-Y plane is defined by the configuration of the paper-side openings 42 of the deflection conduits 36.

Figure 9A:
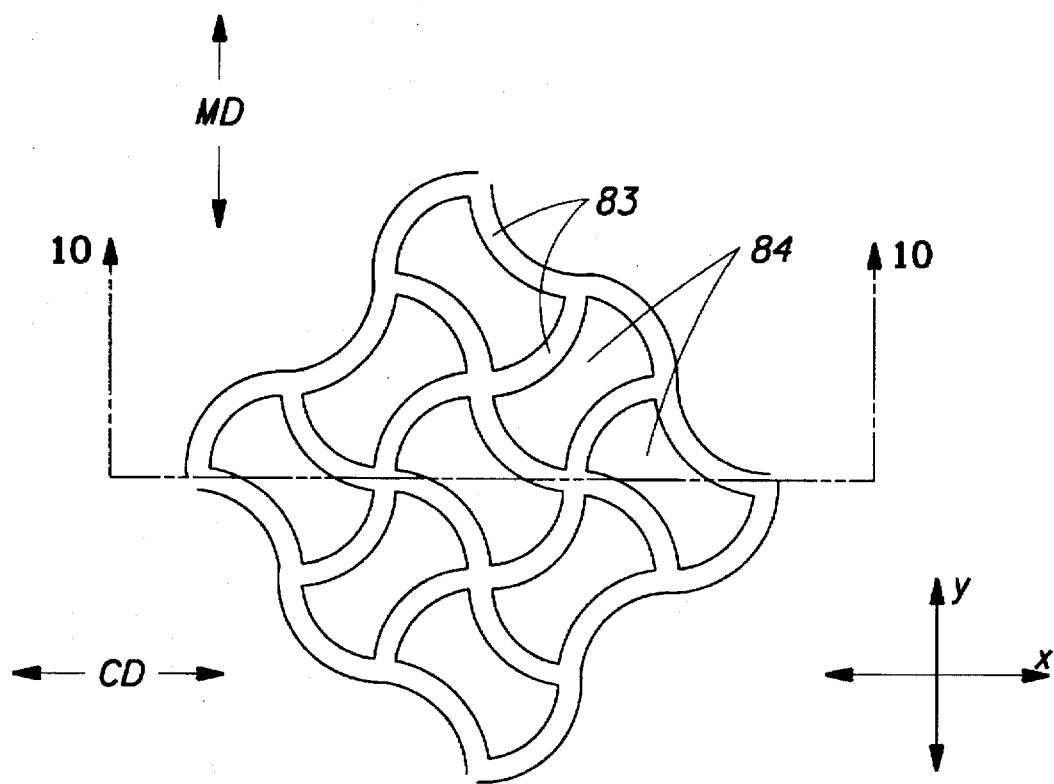
FIG. 9a is a top plan schematic representation of one exemplary framework having bow-tie openings of the deflection conduits, and the portion of the paper web produced using the belt having this exemplary framework.

The shapes of the domes in the X-Y plane include, but are not limited to, circles, ovals, polygons of six and fewer sides, bow-tie shaped figures, weave-like patterns. Preferably, domes are in the form of a closed figured, such as a bow-tie shaped figure, diamond-shaped figure and the like. FIG. 9a schematically shows the exemplary X-Y geometry of a part of the paper web 80 (and, naturally, of the openings 42 of the deflection conduits 36) having the domes in the form of a bow-tie shaped figure.

Only a portion of the paper web (and the first surface 34a) showing a repeating pattern is shown in FIG. 9a. In FIG. 9a, the symbol "MD" indicates machine direction, i.e., the direction which is parallel to the flow of the web through the equipment. The symbol "CD" indicates cross machine direction, i.e., the direction perpendicular to the machine direction in the X-Y plane. Preferably, there are not more than about 80 bow-tie shaped domes per square inch of the paper web, oriented in a bilaterally staggered array pattern as shown in FIG. 9a. It will be apparent to one skilled in the art that when the domes comprise other than bow-tie shaped figure, the number of the domes can be different from that indicated above. It will also be apparent to one skilled in the art that the particular design of the presented in FIG. 9a bow-tie dome is one exemplary design. Other designs of bow-tie figures can be utilized in the present invention, as well as other, different from the bow-tie shapes of the dome. The practical shapes of the domes include, but not limited to, circles, ovals, polygons of six and fewer sides, bow-tie shaped figures, weave-like patterns and the like.

The network region 83 of the paper 80 of the present invention has a high density (weight per unit volume) relative to the density of the dome region 84. The difference in the densities primarily occurs as a result of deflection of fibers into the deflection conduits 36. At the time the embryonic web 27 is associated with the framework 32, the embryonic web 27 has an essentially uniform basis weight. During deflection, fibers are free to rearrange and migrate from adjacent the surface of the paper-side network 34a into the deflection conduits 36 thereby creating a relative paucity of fibers over the surface of the paper-side network 34a and a relative superfluity of fibers fully deflected into the deflection conduits 36. Some deflected fibers are "pulled apart" and separated from each other by the application of the vacuum pressure destroying bonds existing between these fibers. At the same time, the application of the vacuum pressure tends to compress the network region 83 (i.e., that portion of the embryonic web 27 which corresponds with the paper-side network 34a) over the surface of the paper-side network 34a, while the dome region 84 (i.e., the portion of the embryonic web 27 within the deflection conduits 36) is not compressed over the surface of the paper-side network 34a. This compression of the network region 83 tends to further exaggerate the difference in densities between the two regions. In addition, pressing the network area 83 against the Yankee dryer drum 28 even further increases the density of the network 83.

As was shown above; the combination of large domes, low overburden and high fiber support of the belt's reinforcing structure reduces the number of pinholes in the paper of the present invention. In a paper web having the caliper between about 11 mils and 17 mils and the dome area of about 65%, the number of pinholes in the dome area, measured by the analytical procedure described below is not greater than 7500 pinholes per 100 square inches of the paper web. Preferably, the number of pinholes is not greater than 5000 pinholes per 100 square inches of the paper web.

The caliper of the paper web is measured under a pressure of 95 grams per square inch using a round presser foot having a diameter of 2 inches. The dwell time is 3 seconds. The caliper can be measured using a Thwing-Albert Thickness Tester Model 89-100, manufactured by the Thwing-Albert Instrument Company of Philadelphia, Pa. The caliper is measured under TAPPI temperature and humidity conditions. The caliper of the finished paper web is preferably between 9 mils and 30 mils. More preferably, the caliper is between 11 mils and 30 mils. The most preferable caliper of the finished paper web is between 12 mils and 14 mils.

Analytical Procedures Pinholing

For an analytical method of identifying, counting and characterizing pinholes in a specimen of a paper web, a Macintosh computer with a math-coprocessor, at least 4 MB of RAM, and a monitor capable of 256 shades of gray may be used in conjunction with the optical scanner HP ScanJet Hp full page scanner with DeskScan software Version 1.5.2. or later. Macintosh Quadra 800 with MB of 8 RAM, and Iomega External Removable Cartridge Drive are preferred. An Apple High Resolution color monitor, Model M1212 (or a model allowing a higher resolution) can be used. Suitable software is Microsoft Excel, Version 4.0 or later, and Image Version 1.45, available from the National Institute of Health, in Washington, D.C., and QuicKeys 2v 2.1.

A parent roll of the finished paper web 80 is divided along its longitudinal axis into five approximately equal parts. Usually, two parent rolls produced by the same equipment and at the same time are used for testing. At least one paper web sample, randomly taken from each of the five parts of each parent roll is tested. Thus, ten paper web samples are usually tested.

A web sample is placed on the glass of an optical scanner under a black background board. The image through the scanner is digitized and viewed in two dimensions on a computer monitor. The settings are as follows: Brightness is 106; Contrast is 178; Scaling is 200.Print Path is set at 100 dots per inch. The scanning size is about 10 square inches. The sample is scanned into the computer as an image file composed of pixels. The term "pixel" indicates the smallest discrete digitized picture element generated by a computer. The pixel of about 0.0001 square inches is used.

Figure 12A:
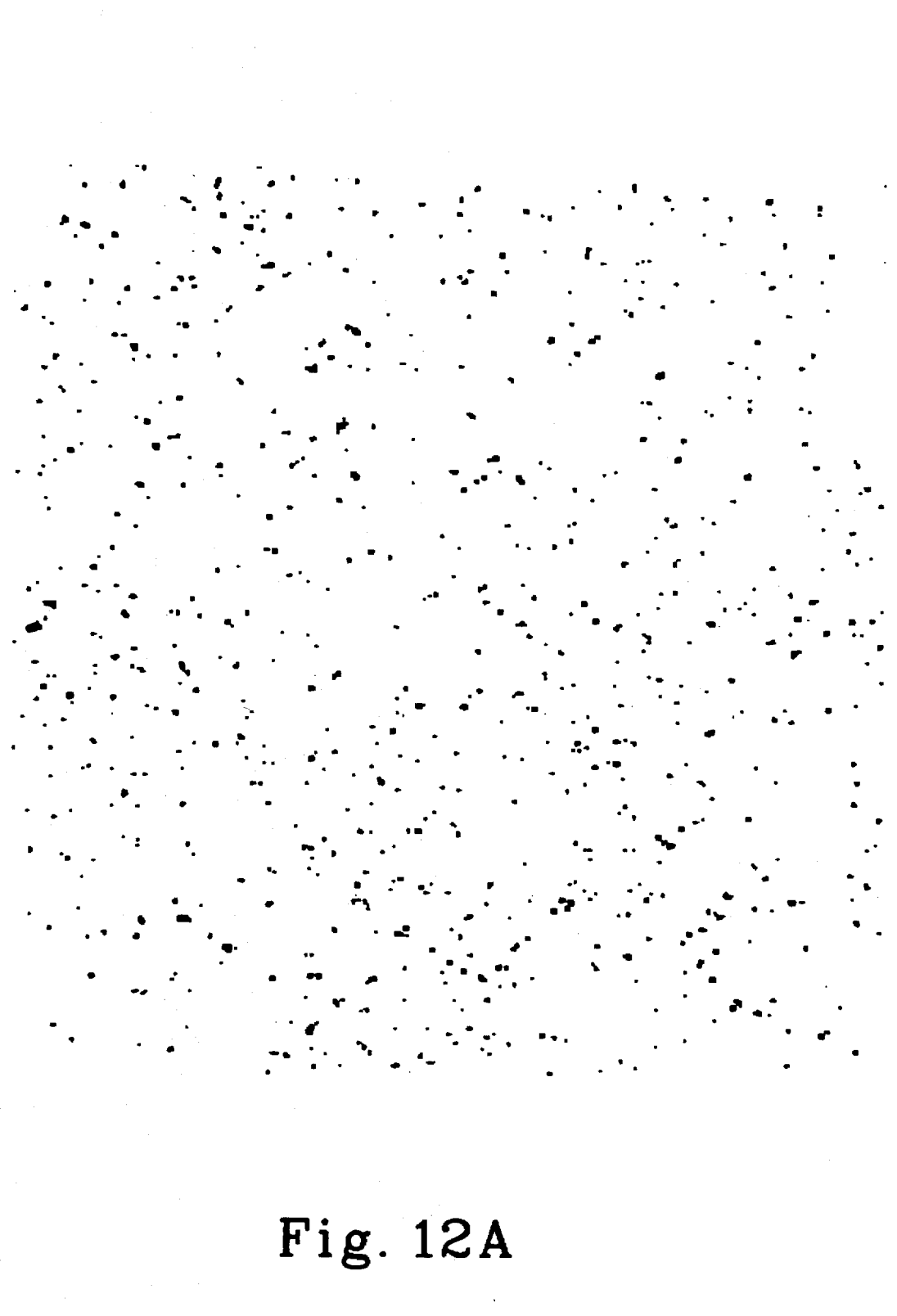
Figure 12B:
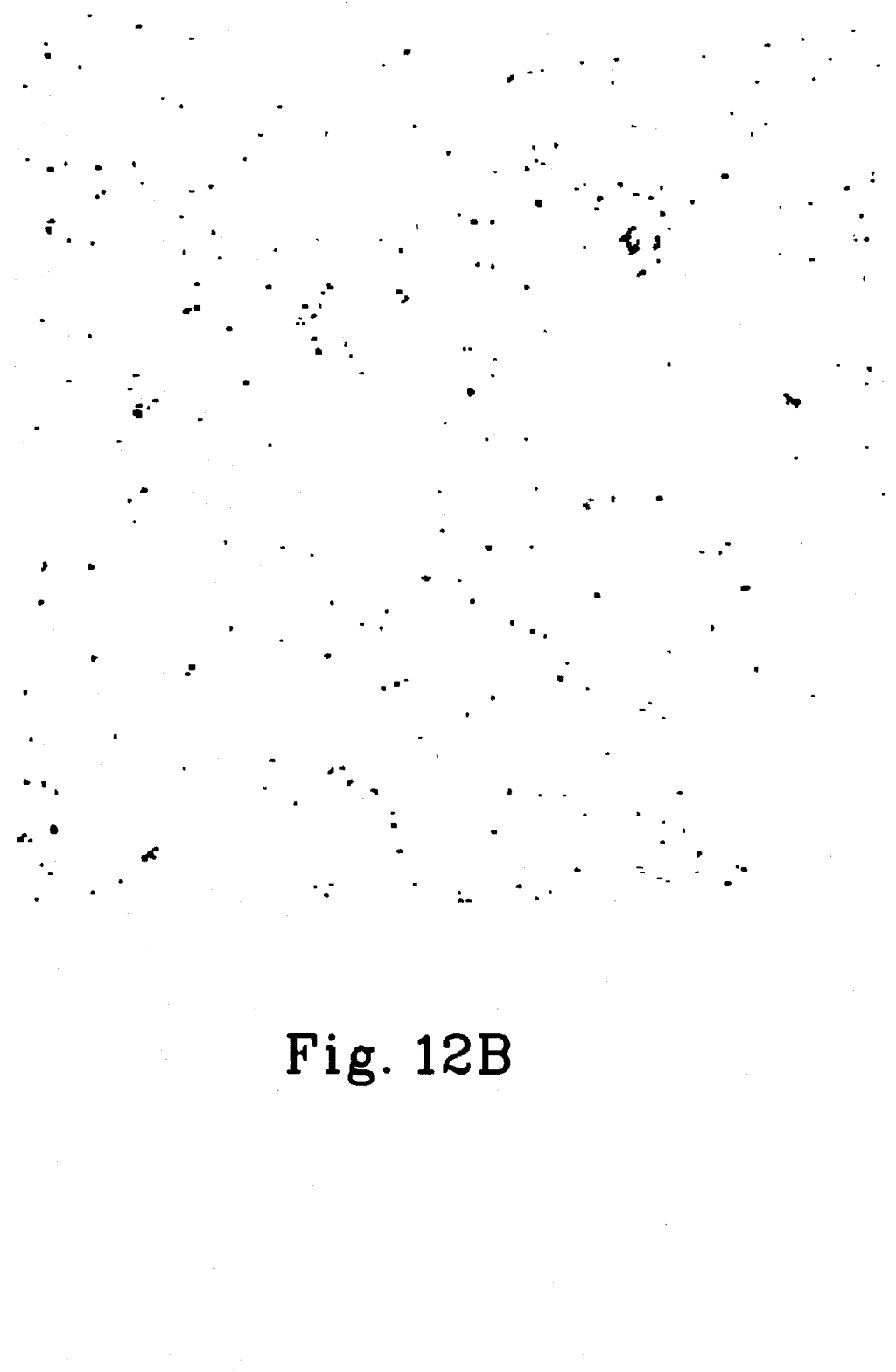

FIG. 12a and 12b illustrates the digitized image of the paper web sample having pinholes, as it could be seen on the computer screen. The image file is processed by an image analysis application that identifies and measures each pinhole in the image according to the specific criteria. For the samples described therein, the threshold of gray level of 254 has been found to work well in the detection of pinholes. The macro selectively measures all of the "suspected" pinholes that have gray value of 254. Then, the data file which lists the size of each pinhole it has found is created. Microsoft Excel is then used to tabulate the data regarding the size, number and distribution of all found pinholes. Appendix 2 represents the resulting Pinhole Analysis. As can be seen from the Appendix 2, the pinhole analysis allows to evaluate not only the number of pinholes, but also—the numerical distribution of the pinholes according to their size, an average single pinhole size, and other relevant data.

FIG. 12a and 12b show the digitized images of the paper web samples produced using two different belts. The Image A is the image of the sample produced using the papermaking belt having a high overburden (OB is about 7.5 mils).

The Image B is the image of the sample produced using the papermaking belt having a low overburden according to the present invention (OB is about 4.9 mils). Other characteristics of the two belts, such as dome size and Fiber Support Index, are about equal. Visual comparison of the two samples shown in FIG. 12a and 12b, illustrate that the paper web produced using the belt with a low overburden according to the present invention has significantly less number of pinholes (Image B) compared to the paper web produced using the papermaking belt having a higher overburden (Image A).

This visual evaluation can be confirmed by the analytical data compiled in Appendix 2. In Appendix 2, the Diagram A represents the data relating to the samples produced using the belt having a high overburden of about 7.5 mils. The Diagram B represents the data relating to the samples produced using the belt having a low overburden of about 4.9 mils. As Appendix 2 shows, the number of pinholes in the samples produced using the belt having a high overburden is 11325 pinholes per 100 square inches (Diagram A). The number of pinholes in the samples produced using the belt having the low overburden according to the present invention is 1592 pinholes per 100 square inches (Diagram B).

As can also be seen from the Appendix 2, the low overburden belt of the present invention improves pinholing not only in terms of the amount of the pinholes, but also—in terms of the size of the pinholes. For example, as presented in the Diagram A, in the samples produced using the high overburden belt, the average number of pinholes having an area of about one pixel is 5852, and the average number of pinholes having an area of about 20 pixels and larger is 51. In the samples produced using the low overburden belt of the present invention, the corresponding numbers are 1084 and 1, as presented in the Diagram B.

By way of illustration, and not by way of limitation, the following examples are presented.

TABLE I

| Type of Reinforcing Structure | Fiber Support Index | Overburden (mil) | Belt Air perm (cfm) | Network Area (%) | Uncalendered Caliper (mil) | Number of Pinholes per 100 square inches | Pinhole Area (Square Mils per 100 square inches) |
|---|---|---|---|---|---|---|---|
| PVT-533 | 94 | 7.5 | 487 | 40 | 23.5 | 9,646 | 654,484 |
| PVT-533 | 94 | 2.9 | 477 | 40 | 19.0 | 2,671 | 121,631 |
| PVT-543 | 94 | 3.1 | 453 | 35 | 17.9 | 2,045 | 86,377 |
| PVT-543 | 94 | 4.9 | 494 | 35 | 20.5 | 2,284 | 100,101 |

The belts having the same Fiber Support Index and relatively similar air permeability were tested in plant manufacturing conditions. As can be seen from the Table I, the pinhole counts related to the belts having a low overburden of 2.9 mils, 3.1 mils, and 4.9 mils (second, third, and fourth lines of the Table I) are significantly less than the pinhole count related to the belt having a high overburden of 7.5 mils (first line of the Table I).

At the same time, comparison of the belts having relatively close overburdens (second and third lines of the Table I) but different ratio of the network area/dome area shows that the pinhole count related to the belt with the smaller network area (35%), and therefore—larger dome area (65%), is lower than the pinhole count related to the belt having larger network area (40%) and therefore—smaller dome area (60%).

TABLE II

| Type of Reinforcing Structure | Fiber Support Index | Overburden (mil) | Belt Air perm (cfm) | Network Area (%) | Uncalendered Caliper (mil) | Number of Pinholes per 100 square inches | Pinhole Area (Square Mils per 100 square inches) |
|---|---|---|---|---|---|---|---|
| HMT-502 | 69 | 11.4 | 488 | 40 | 20.8 | 10,134 | 584,128 |
| HMT-502 | 69 | 7.8 | 479 | 40 | 18.4 | 5,395 | 260,584 |
| HMT-502 | 69 | 3.9 | 532 | 40 | 15.6 | 1,101 | 42,908 |
| PVT-543 | 94 | 11.3 | 485 | 40 | 18.7 | 1,767 | 69,693 |
| PVT-543 | 94 | 9.1 | 415 | 40 | 17.9 | 3,514 | 142,039 |
| PVT-543 | 94 | 4.0 | 463 | 40 | 13.5 | 139 | 4,490 |

Table II represents the results of testing several belts at the pilot plant under simulated conditions. As could be seen from the Table II, the best results in pinholing count (1,101 and 139) were achieved using the belts having low overburden of 3.9 mils and 4.0 mils (third and sixth of the Table II). As between these two belts having low overburdens, the best results in pinholing were received using the belt with the higher Fiber Support Index of 94 (sixth line of the Table II).

What is claimed is:

1. A papermaking belt having a paper-contacting side and a backside opposite said paper-contacting side, said papermaking belt comprising:

a reinforcing structure having a paper-facing side and a machine-facing side opposite said paper-facing side, said reinforcing structure having an air permeability of not less than about 800 cfm and a Fiber Support Index not less than about 75; and a framework joined to said reinforcing structure and extending outwardly not more than about 6.5 mils from said paper-facing side of said reinforcing structure to form an essentially continuous network, said framework having a first surface defining said paper-contacting side of said papermaking belt, a second surface opposite said first surface, and deflection conduits extending between said first surface and said second surface, said first surface comprising a paper-side network and paper-side openings and said second surface comprising a backside network and backside openings, at least about 40% of the area of each of said paper-side openings being not less than about 45 mils in each of its dimensions measured in the X-Y plane at the level of said paper-side network, said paper-side openings and said backside openings defining said deflection conduits.

2. The papermaking belt of claim 1, wherein said reinforcing structure comprises a plurality of machine-direction yarns interwoven with a plurality of cross-machine direction yarns.

3. The papermaking belt of claim 1, wherein said reinforcing structure comprises a first layer of interwoven yarns and a second layer of interwoven yarns, said first and second layers being substantially parallel to each other and interconnected in a contacting face-to-face relationship by tie yarns.

4. The papermaking belt of claim 1, wherein said reinforcing structure comprises a felt.

5. The papermaking belt of claim 1, wherein said paper-side openings are disposed on said first surface in a non-random, repeating pattern.

6. The papermaking belt of claim 5, wherein said non-random, repeating pattern comprises a bilaterally staggered array.

7. The papermaking belt of claim 6, wherein essentially each of said paper-side openings defines a closed figure.

8. The papermaking belt of claim 7, wherein said closed figure comprises a bow-tie shaped figure.

9. The papermaking belt of claim 8, wherein the amount of said deflection conduits is not greater than about 80 conduits per square inch.

10. A papermaking belt having a paper-contacting side and a backside opposite said paper-contacting side, said papermaking belt comprising:

a reinforcing structure having a paper-facing side and a machine-facing side opposite said paper-facing side, said reinforcing structure having air permeability not less than about 800 cfm and Fiber Support Index not less than about 75; and a framework joined to said reinforcing structure and extending outwardly not more than about 6.5 mils from said paper-facing side of said reinforcing structure, said framework having a first surface defining said paper-contacting side of said papermaking belt, a second surface opposite said first surface, and deflection conduits extending between said first and second surfaces, said first surface comprising a paper-side network and paper-side openings, at least about 40% of the area of each of said paper-side openings being not less than about 45 mils in each of its dimensions measured in the X-Y plane at the level of said paper-side network, and said second surface comprising a backside network and backside openings, said paper-side openings and said backside openings defining said deflection conduits;

said reinforcing structure comprising a first layer of a plurality of interwoven yarns having a top dead center longitude remaining within 1.5 yarn diameters of said paper-facing side, and a second layer of a plurality of interwoven yarns, said first and second layers being substantially parallel to each other and interconnected in a contacting face-to-face relationship by tie yarns.

11. A paper web having two regions and comprising:

an essentially continuous, essentially macroscopically monoplanar network region, and a dome region comprising discrete domes, said domes being dispersed throughout, encompassed by, and isolated one from another by said network region, at least about 40% of the X-Y area of each of said domes being not less than about 45 mils in each of its dimensions measured in the X-Y plane at the level of said network region, the density of said network region being greater than the density of said dome region.

12. A paper web of claim 11, wherein said domes are distributed in a repeating pattern.

13. A paper web of claim 12, wherein said repeating pattern comprises a bilaterally staggered array.

14. A paper web of claim 13, wherein the perimeter of substantially each of said domes defines a closed figure.

15. A paper web of claim 14, wherein said closed figure comprises a bow-tie shaped figure.

16. A paper web of claim 15, wherein the amount of said domes is not greater than about 80 domes per square inch of said paper web.

17. A paper web having two regions and comprising:

an essentially continuous, essentially macroscopically monoplanar network region, and a dome region comprising a plurality of discrete domes, essentially all of said domes being dispersed throughout, encompassed by, and isolated one from another by said network region, at least about 40% of the X-Y area of each of said domes being not less than about 45 mils in each of its dimensions measured in the X-Y plane at the level of said network region, the density of said network region being greater than the density of said dome region.

* * * * *

UNITED STATES PATENT AND TRADEMARK OFFICE
CERTIFICATE OF CORRECTION

PATENT NO. : 5,679,222

DATED : October 21, 1997

INVENTOR(S) : DAVID MARK RASCH et al.

It is certified that error appears in the above-identified patent and that said Letters Patent is hereby corrected as shown below:

Column 1, line 28, "modem" should read -- modern --.

Column 7, line 44, "dimond-shaped" should read -- diamond-shaped --.

Column 9, line 29, "*Tappi* April" should read -- *Tappi*/April --.

Column 11, line 53, "above;" should read -- above, --.

Column 12, line 16, "Hp" should read -- IIp --.

Signed and Sealed this

Twenty-fourth Day of February, 1998

Attest:

BRUCE LEHMAN

*Attesting Officer*  *Commissioner of Patents and Trademarks*